United States Patent [19]
Mao et al.

[11] Patent Number: 5,960,205
[45] Date of Patent: Sep. 28, 1999

[54] UPGRADING THE CONTROL OF SWITCHING SYSTEMS

[75] Inventors: Victor Chung-Hsing Mao, Naperville; Albert Taneo Uy, Chicago, both of Ill.

[73] Assignee: Lucent Technologies Inc., Murray Hill, N.J.

[21] Appl. No.: 08/960,642

[22] Filed: Oct. 30, 1997

[51] Int. Cl.⁶ ............................................. G06F 9/45
[52] U.S. Cl. ........................ 395/712; 364/133; 379/112
[58] Field of Search ............................ 364/133; 379/201, 379/207, 230, 112; 395/712

[56] References Cited

U.S. PATENT DOCUMENTS

| | | | |
|---|---|---|---|
| 4,731,817 | 3/1988 | Jonsson et al. | 379/112 |
| 4,747,127 | 5/1988 | Hansen et al. | 379/93.14 |
| 5,097,528 | 3/1992 | Gursahaney et al. | 379/88.21 |
| 5,195,129 | 3/1993 | Yazawa et al. | 379/93.17 |
| 5,345,590 | 9/1994 | Ault et al. | 395/406 |
| 5,359,730 | 10/1994 | Marron | 395/712 |
| 5,421,017 | 5/1995 | Scholz et al. | 395/712 |
| 5,526,415 | 6/1996 | Wakamoto | 379/230 |
| 5,541,986 | 7/1996 | Hou | 379/201 |
| 5,550,906 | 8/1996 | Chau et al. | 379/207 |
| 5,651,059 | 7/1997 | Morgan | 379/207 |
| 5,740,236 | 4/1998 | Pruitt | 379/201 |
| 5,822,422 | 10/1998 | Daase et al. | 379/269 |
| 5,848,144 | 12/1998 | Ahrens | 379/219 |
| 5,875,242 | 2/1999 | Glasner et al. | 379/207 |
| 5,883,948 | 3/1999 | Dunn | 379/210 |

*Primary Examiner*—Tariq R. Hafiz
*Assistant Examiner*—Michael Pender
*Attorney, Agent, or Firm*—Werner Ulrich

[57] ABSTRACT

In a telephone switching system, a method of performing a multiple release jump to a target program release for controlling the system. The system uses duplicate processors and disk file controllers. A new disk file is initialized with new program text and a target release version of office dependent data. This target release version is derived by upgrading the office dependent data one release at a time until office dependent data for the target release is derived. The new program text and target release version of office dependent data is inserted into one member of a duplicate disk file controller system which may either be a new disk file controller or one of the two disk file controllers currently in use in the system. One of a duplicate set of processors, either one of the presently utilized processors, or a new processor being introduced along with the new release is then connected to the peripheral system and the disk file controller for accessing the new program text and target release version of office dependent data. Control is then turned over to that processor. Following successful operation during a soak interval the other member of the duplicate processors is connected to the disk file controller, if disk file controllers have been changed, and the other disk file is updated with the new program text and office dependent data. Advantageously, this arrangement allows a multiple release jump to be made without requiring special software for the particular jump, or without requiring that the multiple release jump be performed one step at a time.

3 Claims, 2 Drawing Sheets

UPGRADING THE CONTROL OF SWITCHING SYSTEMS

TECHNICAL FIELD

This invention relates to arrangements for upgrading the software for the control of switching systems or other real time systems.

BACKGROUND OF THE INVENTION

Modem telecommunications switching systems are controlled by data processing systems. These data processing systems are controlled by a program stored in the memory of the data processing system. As demands for more features and improved capacity evolve over time, the program for these systems is changed to adapt them to these new requirements. Usually, program changes are introduced with a "new release", although, of course, small errors are frequently corrected through small changes in the program.

The changes in the program are frequently accompanied by changes in the memory; both the random access memory (RAM), and the bulk memory such as this used by these systems since the changes frequently require more memory, and since new types of faster and higher capacity bulk memories are constantly being introduced in the market.

A problem arises in switching systems and other real time systems whose operation cannot be interrupted in introducing such changes without disrupting service. Methods have been found for introducing new releases one step at a time through the use of special conversion software to convert the data base from one release to the next, the conversion software being written specifically for this single step conversion, and for making the transition from one release to the next through a process which involves the use of the duplicate equipment that is provided in the control processors. One processor controls the system under the old release while the second processor is being loaded with the program and data base of the new release. A transition is made to control by the second processor and its memory, and the first processor is kept in the old release until it has been determined that the system operates satisfactorily under the control of the second processor. Thereafter, the first processor is updated with the new release and the data base for the new release, and the system operates under the new release.

This solution is unsatisfactory for the case in which it is desired that a switching system be updated by several release steps. The method requires that such updating be performed one step at a time, preferably with a substantial time within each step to insure that the system is still operating satisfactorily. The demand for multiple step upgrade is quite high since many telephone administrations chose to stay in one release for a number of years until there is an overwhelming need for a new release; at that time, the normal procedure is to upgrade immediately to the newest release.

A problem of the prior art is that there is no satisfactory way of performing a single jump multiple release upgrade in a switching system or other real time control systems.
Solution The above problem is solved and an advance is made over the prior art in accordance with our invention wherein a multiple step release is made by having a transition from the early release to a state wherein one of the duplicate control processors operates using a new bulk memory pre-initialized with the data base and program of the new release; after a period of satisfactory operation in the new release, the second processor is also connected to a newly initialized bulk memory, and the system operates in the new release. Advantageously, the jump is accomplished as a single upgrade process. Advantageously, this arrangement does not require any special jump retro-fit software support. Advantageously, such an arrangement avoids the cost of hardware required for intermediate releases, but not required for the initial and final release. Advantageously, the upgrade can be accomplished in a single jump process instead of a group of smaller upgrades.

In accordance with applicants' preferred embodiment, the transition of each of the two processor and associated bulk memory is accomplished by taking the processor out of service and reconnecting the cable to bulk memory from the initial bulk memory to the new bulk memory. Advantageously, such an arrangement avoids the requirement for multiple memory ports to support the transition.

In applicants' preferred embodiment, the data base is updated one release at a time using the software for making the transition in the data base from one release to the next. This updating is performed off-line and the new release version of the data base, as well as the new release version of the program is then initialized into the new bulk memory. In applicants' preferred embodiment, this off-line process is performed in a worling switch using a simplex moving head drive. Advantageously, such an arrangement avoids the necessity for additional software development for the conversion of the data base for a jump in releases, or alternatively, avoids the long and labor-intensive process of implementing a multiple release change through a series of single release changes.

DETAILED DESCRIPTION

Figure 1:
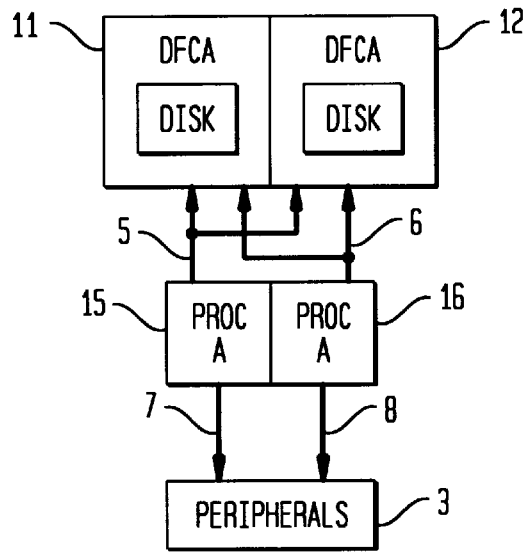
FIGS. 1 and 2 are initial and final configurations of a system being upgraded through multiple releases of the program and through a change of processors and disk file controls.
Figure 2:
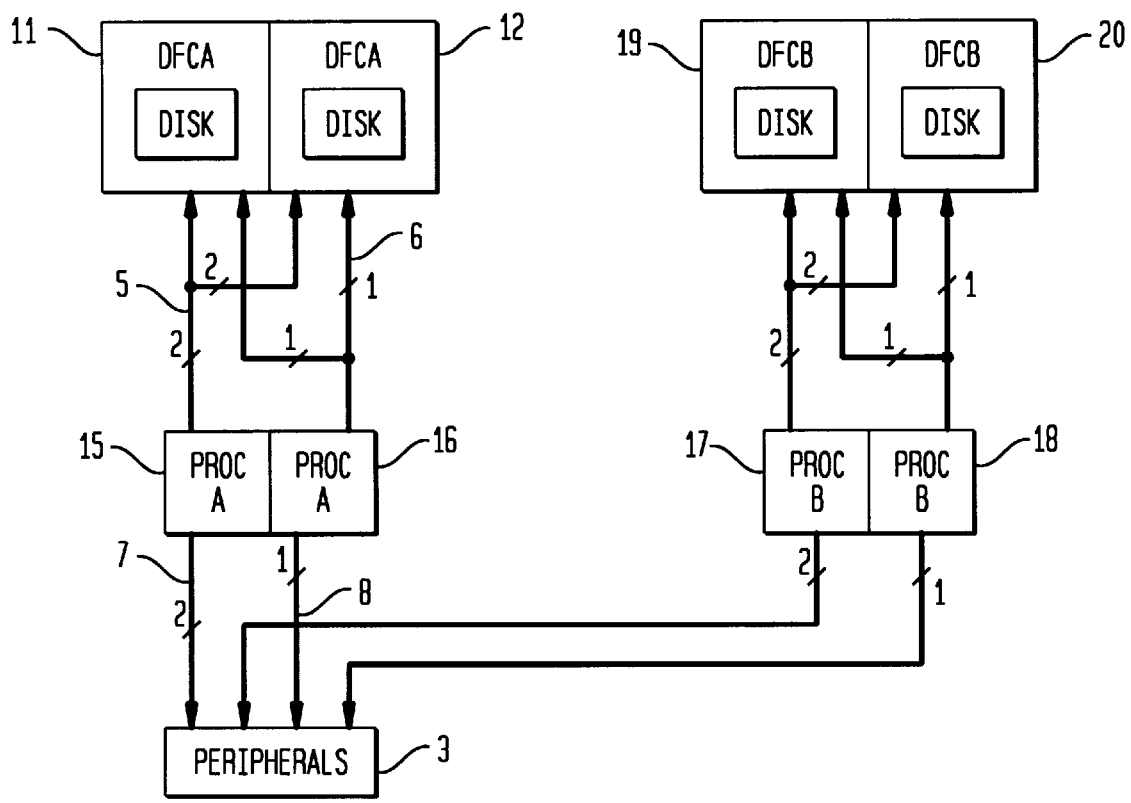

FIG. 1 illustrates the system comprising duplicated processors A, 15 and 16, duplicated disk file controllers 11 and 12, and peripherals 3. Each processor can drive and receive information from the peripherals over buses 7 and 8 respectively. Each processor communicates with both disk file controllers via buses 5 and 6 respectively. FIGS. 1 and 2 illustrate the most general case in which in addition to having an upgrade of several program releases being performed in accordance with applicant's invention as a single upgrade step, but also illustrates the process of changing disk file controllers and/or processors during one of the multiple upgrade steps. In this case, it is assumed that the initial processors are, processors A, initial disk file controllers are disk file controllers A, and that the upgraded processors and disk file controllers are processors B, 17 and 18 and disk file controllers B 19 and 20. If the disk file controllers are not being changed, i.e., if disk file controller A is in fact disk file controller B or the processors are not being changed, i.e., processors A are the same as processors B, then any indications of moving tables from an A type unit to a B type unit can be ignored.

It is assumed in this case that the disk file controllers can accept insertable disks as a means of upgrading their memory. If this is not the case, then the usual arrangements for uploading disks, well known in the prior art, can be used.

FIG. 2 is the final configuration of the system. Note that since processors A are no longer connected, and therefore no longer needed, these processors can be reused as can disk file controllers A. Note further, that in case either or both of these units are retained, that these are simply continued in use. Further, if a system upgrade is sufficiently radical so that two generations of disk file controllers or processors are used in going from units of A type to units of B type, that there is no need ever to introduce intermediate processor or disk file controller since the system never operates at an intermediate release. The symbols "1" and "2" indicate connections made before the upgrade and after the upgrade, respectively.

Figure 3:
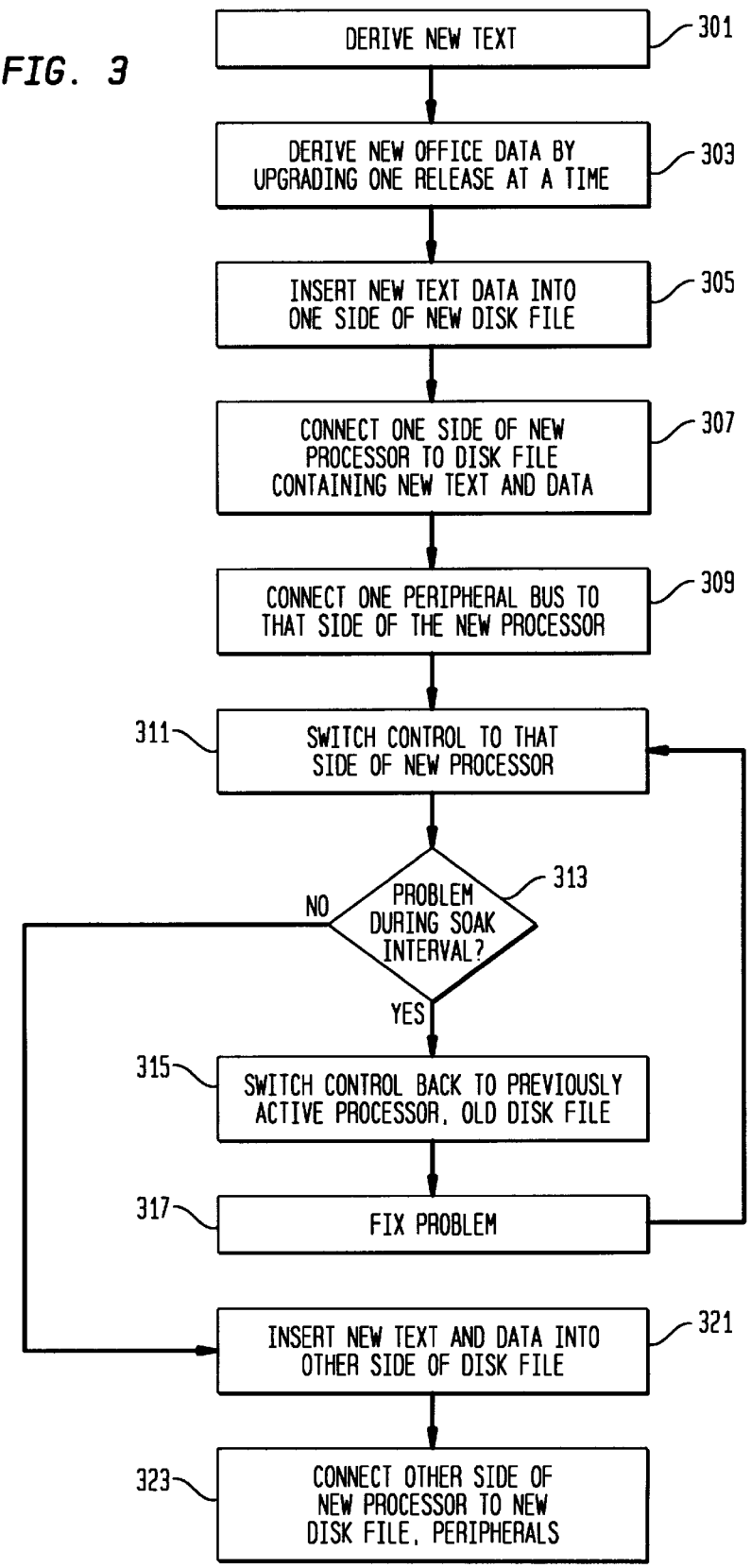
FIG. 3 is a flow-diagram illustrating the process of switching from an earlier program to a later program.

FIG. 3 illustrates the process of performing the upgrade. Action block 301 indicates that new program text must be derived. This new program text is simply the newest release. Action Block 303 is key to applicant's invention. The new office data is derived from the original office data by upgrading the office data one release at a time. In order to allow programs to progress from one release to the next, it is required that a program be derived for going from each program issue to the next program issue. This is a minimum requirement. In accordance with the teachings of applicant's invention, if one, two, or more intermediate releases are skipped, the intermediate office data is derived for each step using the previous issue of office data and the one step upgrading program. For example, if the system goes from release 11 to release 15, the office data of release 11 currently resident in the system is first upgraded to office data for release 12, using the 11–12 upgrading software. Release 12 office data is then upgraded to release 13 office data using the release 12–13 upgrade program. This is repeated to get to release 14 data and repeated once more to get to release 15 office data.

The new text and the new data are then inserted into one side of the new disk file, Action Block 305. If the new disk file is in fact different from the old disk file, i.e., if disk file B is not the same as disk file A, then the new text and data can be inserted into both sides of the new disk file; obviously, this cannot be done if the new disk file and the old disk file are the same since this would risk crashing the system if the system were incapable of running with the new text and new data because of some program or data flaw. In Action Block 307, one side of the new processor (or if the new processor is the same as the old processor, the currently acting stand-by side of the old processor) is connected to the new disk file. In Action Block 309, 1 peripheral bus is connected to that side of the new processor, i.e., the side connected to the new disk file (or the disk file containing new data if the disk file is not being changed). At this point, control of the system is switched to that side of the new processor, i.e., the side connected to the new text and data of the new disk file (Action Block 311). A soak interval is then used to test if the system is capable of operating under the control of the new program text and new office data (test 313). If a problem is encountered during the soak interval, then control is switched back to the previously active processor, and the old disk file (Action Block 315). The problem is then addressed, and fixed (Action Block 317). Following the fixing of the problem, Action Block 311 is re-entered to try again to see if the system can operate for a full soak interval under the control of the new processor. If the soak interval is successfully passed without any problems, then the new text and data is inserted into the other side of this disk file (Action Block 321) (if the disk file had not been changed this is necessary; if this disk file had been changed as noted with respect to Action Block 305, this may already have been done). Finally, the other side of the new processor is connected to the new disk file, and to the peripheral (Action Block 321).

Advantageously, this arrangement allows a multiple stage upgrade to be performed as a single step. This is economical because each upgrade must be carefully observed, and may result in the loss of some calls. Further, during the upgrade interval, substantial staff must be available in case of problems. Further, it is not necessary to provide intermediate disk file controllers or processors using this process. Advantageously, such an arrangement not only saves money, but encourages more frequent updates of processors and disk file controllers.

The above description pertains to one specific preferred embodiment of applicant's invention. Many other arrangements will be apparent to those of ordinary skill in the art. The invention is limited only by the accompanying claims.

We claim:

1. In a telephone switching system, a method for performing a multi-stage software upgrade to a target release, comprising the steps of:

(a) in said telephone switching system, providing duplicate processors and duplicate disk file controllers, each controller comprising a disk file;

(b) deriving program text for the target release;

(c) deriving office dependent data for the target release by iteratively deriving intermediate release office dependent data, in each case from a previous release of office dependent data;

(d) inserting said program text and said office dependent data for the target release into a file of one of said duplicate disk file controllers;

(e) connecting said one of said duplicate disk file controllers to one of the duplicate processors;

(f) connecting said one of said duplicate processors to peripherals of said telephone switching system;

(g) switching control of said telephone switching system to said one of said duplicate processors;

(h) inserting said program text and said office dependent data for the target release into a file of the other of said duplicated disk file controllers;

(i) connecting the other of said processors to the other of said duplicate disk file controllers; and (j) connecting the other of said duplicate processors to said peripherals of said telephone switching system.

2. The method of claim 1, further comprising the steps of:

(k) prior to executing step (b), the step of deriving program text for the target release, testing whether new duplicate disk file controllers, each comprising a disk file, are required in order to upgrade to the target release;

(l) if the result of the test of step (k), indicates that no new duplicate disk file controllers are required, executing steps (b)–(j);

(m) if the result of the test of step (k), indicates that new duplicate disk file controllers are required, providing said new disk file controllers;

(n) inserting said program text and said office dependent data for the target release into a file of one of said new duplicate disk file controllers;

(o) connecting said one of said duplicate disk file controllers to one of the duplicate processors;

(p) inserting said program text and said office dependent data for the target release into a file of said new duplicate disk file controllers;

(q) inserting said program text and said office dependent data for the target release into a file of the other of said new duplicate disk file controllers.

3. The method of claim 1, further comprising the step of:

(r) prior to executing step (b), the step of deriving program text for the target release, testing whether the new duplicate processors are required in order to upgrade to the target release;

(s) if the result of the test of step (r), indicates that no new duplicate processors are required, executing steps (b)–(j);

(t) if the result of the test of step (r), indicates that new duplicate processors are required, providing new duplicate processors.

* * * * *